United States Patent [19]
Munday

[11] Patent Number: 5,143,025
[45] Date of Patent: Sep. 1, 1992

[54] HYDROGEN AND OXYGEN SYSTEM FOR PRODUCING FUEL FOR ENGINES

[76] Inventor: John F. Munday, General Delivery, Shediac Bridge, New Brunswick, Canada, E0A 3H0

[21] Appl. No.: 645,629

[22] Filed: Jan. 25, 1991

[51] Int. Cl.⁵ .............................................. F02B 43/08
[52] U.S. Cl. ................... 123/3; 123/DIG. 12; 204/270
[58] Field of Search .................. 123/3, DIG. 12; 204/129, 270, 278

[56] References Cited

U.S. PATENT DOCUMENTS

| | | | |
|---|---|---|---|
| 1,380,183 | 5/1921 | Boisen | 123/DIG. 12 |
| 3,939,806 | 2/1976 | Bradley | 123/DIG. 12 |
| 4,031,865 | 6/1977 | Dufour | 123/DIG. 12 |
| 4,442,801 | 4/1984 | Glynn et al. | 123/3 |
| 4,457,816 | 7/1984 | Galluzzo et al. | 204/270 |

FOREIGN PATENT DOCUMENTS

2641228 1/1978 Fed. Rep. of Germany .......... 123/3

Primary Examiner—Noah P. Kamen
Attorney, Agent, or Firm—John B. Dickman, III

[57] ABSTRACT

A water to fuel production apparatus including a tank divided into compartments for producing hydrogen in one compartment and oxygen in another compartment, where the gases produced do not contact each other in the compartments or until they are mixed prior to entering an internal combustion engine. A control system including cathodes and anodes in the compartments and a switching system to turn individual cathodes and anodes on or off.

17 Claims, 7 Drawing Sheets

HYDROGEN AND OXYGEN SYSTEM FOR PRODUCING FUEL FOR ENGINES

BACKGROUND OF THE INVENTION

The present invention relates generally to a fuel system of internal combustion engines, and more particularly to a hydrogen and oxygen producing system to provide fuel to an internal combustion engine.

Petroleum fuels have been used to operate internal combustion engines ever since the invention of the internal combustion engine. In fact, petroleum fuels have been used so much over the past one hundred years they are becoming short in supply. Shortage of gasoline has at times created gasoline lines at filling stations. Because of pending greater shortages, there are several research projects focused on new sources of fuels. Petroleum shale has been researched as a potential new source of fuels, however, research has been expensive and slow. Another source of fuel is natural gas.

A greater problem with the use of petroleum fuels is the pollution created by burning them. Petroleum products contain several pollutants such as sulfur compounds, carbon monoxide, and trace metals that are released into the atmosphere when burned. The obvious concerns with petroleum pollutants are the effects on the environment and humans. Wildlife and plant life are being destroyed by the effects of pollution. Humans are developing respiratory problems and other pollution related problems.

There have been attempts to provide an internal combustion engine that would use fuels other than petroleum fuels. One of the better known fuels is alcohol, which was used during the Second World War in European countries. Another is hydrogen gas which has a low flash point and very dangerous to carry in a vehicle. Finally, mixtures of hydrogen and oxygen gases have been used as fuel for internal combustion engines. The inventor is familiar with the following U.S. Patents on oxygen and hydrogen fuel systems for internal combustion engines:

U.S. Pat. No. 583,104 issued to Wattles
U.S. Pat. No. 2,365,330 issued to Carmichael
U.S. Pat. No. 2,496,623 issued to Fragales
U.S. Pat. No. 3,648,668 issued to Pacheco
U.S. Pat. No. 4,009,006 issued to Hreka
U.S. Pat. No. 4,023,545 issued to Mosher et al The patent issued to Carmichael discloses electrolytically producing hydrogen and oxygen gases from water and using the gases as fuel in an internal combustion engine. The gases are separately collected in holding tanks and subsequently pumped to the engine cylinders where they are combined prior to entering the cylinders for explosion. A manually operated valve means controls the flow of gases to the engine.

In Fragales, hydrogen and oxygen gases are produced by electrolysis of water and the gases are separately introduced into the cylinders of an internal combustion engine. According to the disclosure, the hydrogen and oxygen gases explode on contact in the cylinder, however, the disclosure is devoid of information as to the source of the explosion. There is no suggestion of an electrical spark or spontaneous combustion. Additionally, unless the level of the water is always maintained in the tubes above the tank, both hydrogen and oxygen will be fed into both tubes and the danger of flash back from the explosion in the cylinder is possible.

The danger of flash back is possible in Wattles where a single pipe, intended to remove just hydrogen to operate an engine will remove both oxygen and hydrogen. Wattles failed to separate the oxygen from the hydrogen so that only hydrogen is removed by the pipe. The engine cylinder has electrodes for exploding the hydrogen to move the engine piston. There are valves to regulate the flow of hydrogen, however the operation of the valves is not explained. The presence of both hydrogen and oxygen could possible cause flash back past the valves if they are not in fact leak proof. The possibility of flash back also exists in Hreka and Mosher et al.

The present invention overcomes the inadequacies of the prior art by providing a hydrogen-oxygen gases producing system which separates the two gases during their production and does not combine them until just before entry into the engine cylinders. There is also provided a throttle to uniquely control the production of hydrogen and oxygen gases according to the needs of the engine operation.

SUMMARY OF THE INVENTION

The present invention has for its primary object to provide a hydrogen and oxygen gases production system by electrolysis of water for direct use in an internal combustion engine.

Another object of the present invention is to provide a control for the production of hydrogen and oxygen gases according to the engine needs.

A further object of the present invention is to provide an efficient apparatus for the production of hydrogen and oxygen gases for direct use in an internal combustion engine.

Still another object of the present invention is to provide a hydrogen and oxygen gases production system adaptable to existing internal combustion engines.

The hydrogen and oxygen gases production system of the invention has a plurality of cathodes and anodes for separating hydrogen and oxygen gases from water by electrolysis. The cathodes and anodes are separated by dividers in a container to prevent premature combining of the separated gases. Each cathode and anode is surrounded by a non-conductive tube to prevent the separated gases from collecting at the electrode. The electrodes, which can vary from a few to many, and they can be supplied with electricity individually to vary the amount of hydrogen and oxygen gases. As the number of electrodes becomes electrified more fuel gases are produced and the faster the engine runs, comparable to supplying more gasoline to a gasoline engine. Electrical energy is supplied to the electrodes via an accelerator pedal which activates each electrode in sequence until all electrodes are energized.

The hydrogen and oxygen gases thus produced enter the engine cylinders either separately or as a just combined mixture where a spark ignites the mixture forcing the piston to reciprocate. Mechanical energy is produced by the output of the reciprocating pistons. The electrolysis tank may have an atmospheric purge valve for removing air from the hydrogen gas. In another embodiment an inverted "U" bend tube prevents flash back, controlling the amount of hydrogen in the atmospheric air and eliminating the purge valve.

DESCRIPTION OF THE INVENTION

Figure 1:
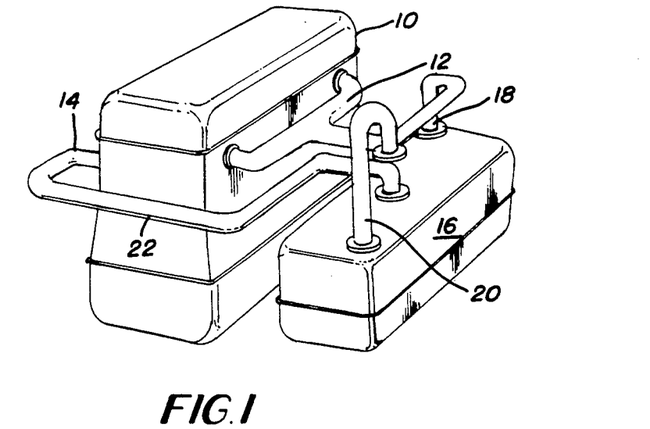
FIG. 1 shows a perspective view of an internal combustion engine fueled by a fuel production system of the invention.

Referring to the drawings there is shown in FIG. 1 an internal combustion engine 10 connected by an intake manifold 12 and an exhaust manifold 14 to a fuel tank 16. An oxygen gas inlet manifold 18 carries oxygen gas to the inlet manifold 12. Hydrogen gas inlet manifold 20 also carries gas to the inlet manifold 12. The two gases, hydrogen and oxygen, are mixed together just before entering the inlet manifold to prevent any flash back. Exhaust gases are moved from the engine 10 through manifold 14 and exhaust tube 22 which empties into the fuel tank 16.

Figure 2:
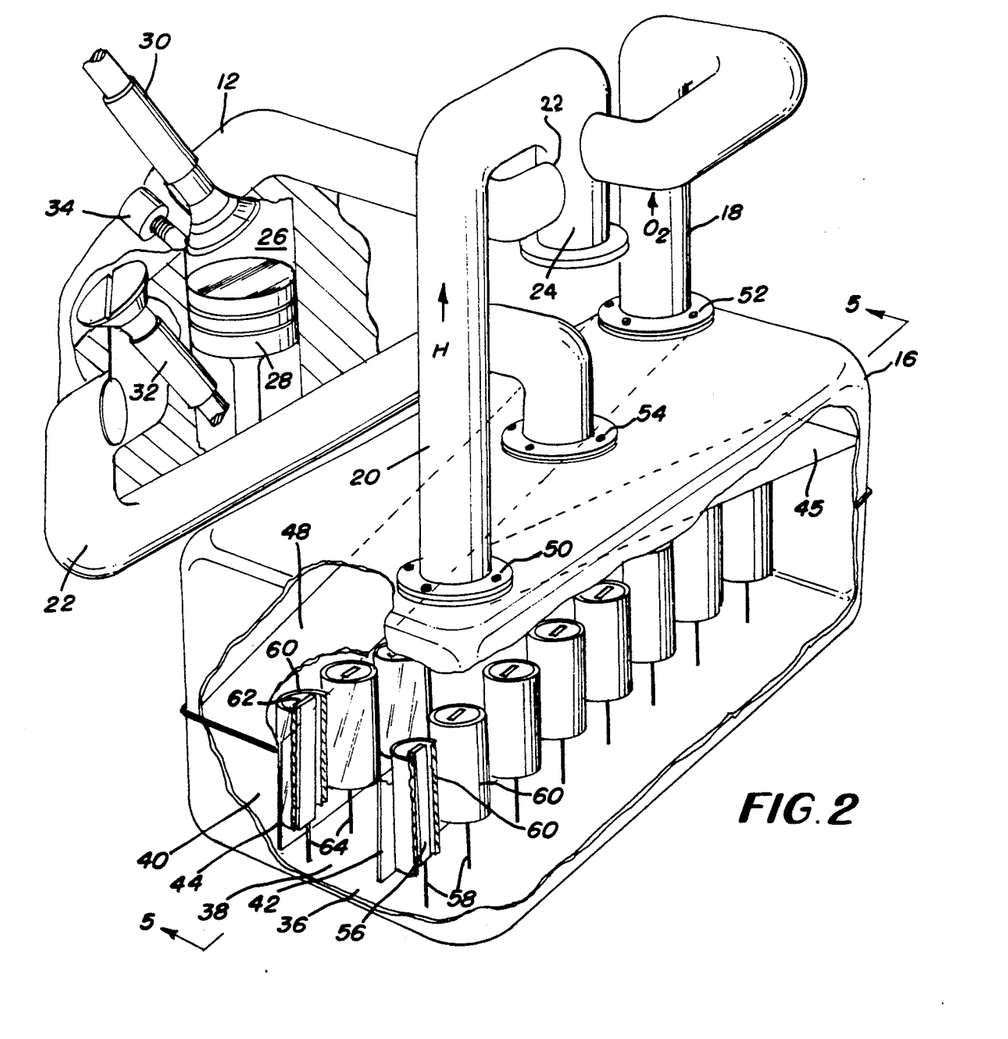
FIG. 2 shows a perspective view of the fuel production system of the present invention.

In FIG. 2 the feeding of fuel to the engine 10 is better understood. Oxygen is removed from the fuel tank 16 and carried to a vertical mixing or combining manifold 24. Hydrogen is similarly removed from the fuel tank 16 and carried to the mixing manifold 24 which has an opening 25 to the intake manifold 12 separate inlet pipes 18 and 20 where the two gases are combined before entering the manifold 12 by. A single cylinder 26 and a reciprocating piston 28 represent an internal combustion engine. The fuel gases are forced into the cylinder 26 and pass an intake valve 30 which opens and closes to only emit gases. An exhaust valve 32 opens to allow egress of used gases and water vapor. The fuel gases are ignited by a spark from spark plug or glow plug 34.

The fuel production tank 16 is divided into three compartments 36, 38 and 40 by dividers 42 and 44. There is communication between the compartments along the bottom of the tank 16. Water is allowed to flow between the compartments along the bottom of the tank. On the other hand, the dividers 42 and 44 have inclined top walls 46 and 48, respectively, which isolates the hydrogen gases in compartment 36 from the oxygen gases in compartment 40. Each compartment 36 and 40 has an outlet 50 and 52, respectively, for removing the electrolytically produced hydrogen and oxygen. Center compartment 38 is for receiving additional water for the tank and for the exhausted gases and water vapor from exhaust pipe 22. Center compartment 38 has an inlet 54 for admitting exhaust gases and water vapor.

A plurality of cathodes 56 are mounted in compartment 36 with the electrode positioned above the bottom edge of partition 42 to prevent hydrogen formed by the cathodes 56 from escaping. Each cathode 56 has an electrical lead 58 which connects to a source of electricity. A glass or some type of insulating tube 60 surrounded the cathodes 56 to keep the hydrogen gases away from the cathodes, making them more efficient.

A similar number of anodes 62 are mounted in compartment 40, again with the electrodes positioned above the bottom edge of partition 44 to prevent oxygen formed by the anodes 62 from escaping. Each anode 62 has an electrical lead 64 which connects to a source of electricity. Glass or some type of insulating tube 60 surrounds the anodes 62 to keep the oxygen gases away from the anodes.

Figure 3:
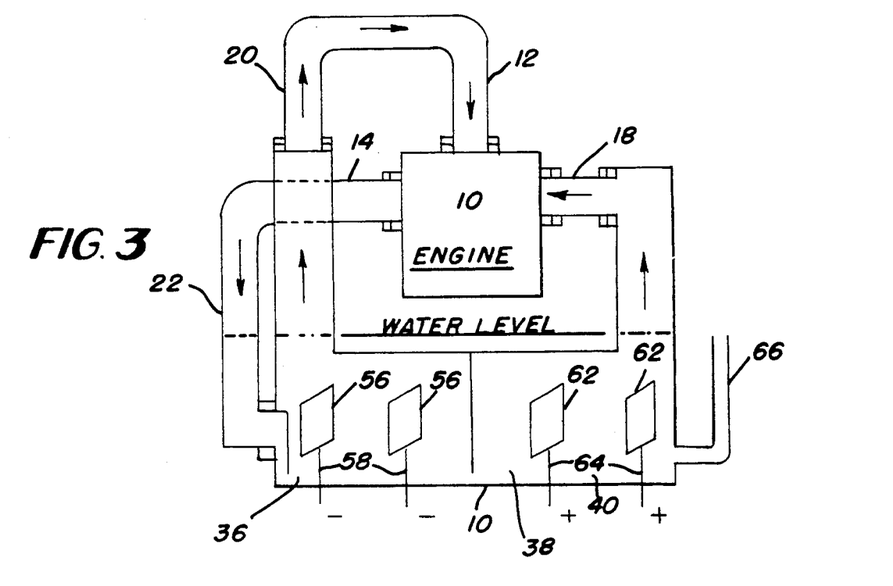
FIG. 3 shows a plan view of an internal combustion engine fueled by a fuel production system of the invention.

FIG. 3 is a schematic of internal combustion engine 10 and fuel production tank 16. The production tank 16 is divided into hydrogen and oxygen production compartments 36 and 40, respectively. There is a divider 57 separating the compartments 36 and 40. In this figure there is no center compartment 38 as in FIG. 2, instead exhaust gases are pumped into compartment 36. Fresh water is added via fill pipe 66 into compartment 40. There are cathodes 56 in compartment 36, and anodes 62 in compartment 40.

Hydrogen inlet 20 and oxygen inlet 18 empty into the engine intake manifold. Hydrogen and oxygen gases produced in the tank 16, leave the respective compartments 36 and 40 separately and co-mix either in the intake manifold or in the engine cylinders. Exhaust gases are carried to compartment 36 via tube 22.

Figure 5:
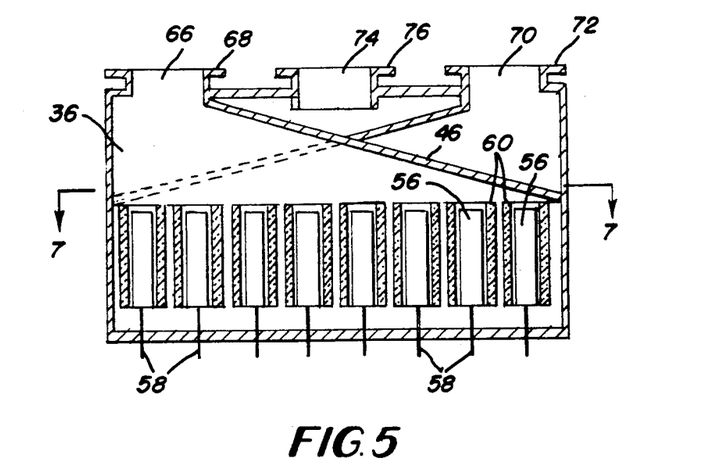
FIG. 5 shows a fuel production tank taken along the line 5—5 of FIG. 2 and FIG. 7.
Figure 6:
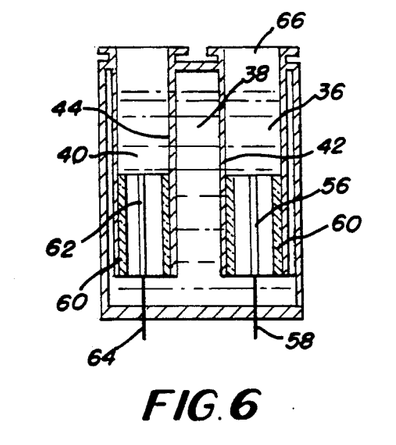
FIG. 6 shows a fuel production tank taken along the line 6—6 of FIG. 2 and FIG. 7.
Figure 7:
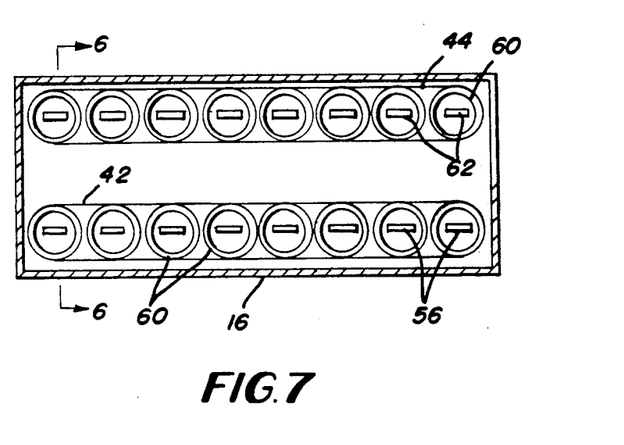
FIG. 7 shows a top plan view of a fuel production tank of the invention, taken along the line 7—7 of FIG. 5.

FIGS. 5–8 show the fuel production tank 16 having three compartments, 36 (for hydrogen production), 40 (for oxygen production), and 38 (for receiving fresh water and exhaust gases and water vapor). FIGS. 6 and 7 show the three compartments best, where in FIG. 6 the lower ends of the dividers 42 and 44 are shown above the bottom of tank 16 and the water flow is shown moving down through middle compartment 38 and spreading out into compartments 36 and 40. In FIGS. 6 and 7, the cathodes 56 and anodes 62 are surrounded by an insulated cylinder 60, such as glass, and are connected by electrical leads 58 and 64, respectively, to a source of electricity.

Figure 8:
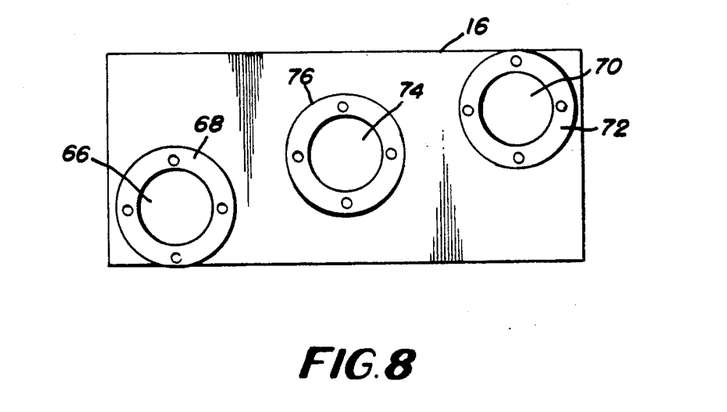
FIG. 8 is a top plan view of a fuel production tank of the invention.

FIG. 5 shows the bank of cathodes 56 surrounded by cylinders 60 and connected to electrical leads 58. The leads 58 and 64 project through the bottom of the tank 16 to connect to a source of electricity, which will be discussed later. Compartment 36 has an opening 66 formed in the top wall 46 of divider 42. Opening 66 has a flange 68 which connects to hydrogen pipe 20. Similarly, compartment 40 has an opening 70 surrounded by a flange 72 which connects to oxygen pipe 18. Middle compartment 38 also has an opening 74 surrounded by flange 76 to connect to exhaust pipe 22. FIG. 8 shows a top view of the openings and flanges.

Figure 9:
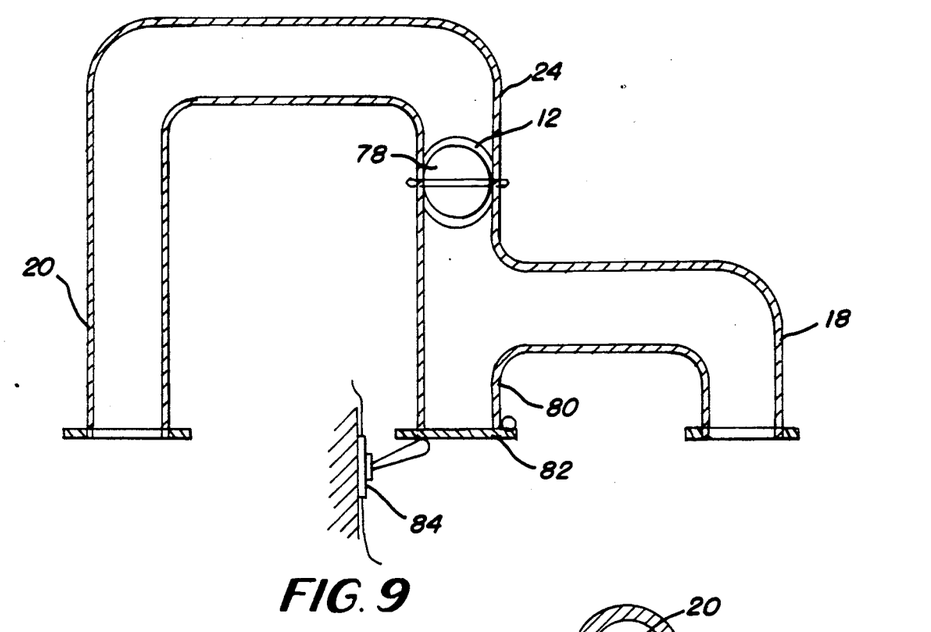
FIG. 9 is a modification of a cut-way of a hydrogen gas inlet manifold of the invention.

FIG. 9 is directed to the hydrogen inlet manifold 20 and oxygen inlet manifold 18 connected to an intake manifold 12. There is a throttle 78 pivotally mounted in intake manifold 12. A down pipe 80 with a hinged blow back valve cover 82 is a safety feature of the invention. In case hot gases in the engine ignite the hydrogen and oxygen that reach the intake manifold 12 there may be blow back. Blow back is the ignition of hydrogen and oxygen prematurely, causing high pressure and combustion in the pipes 18 and 20. Should this happen, the hinged valve cover 82 is forced open, expelling the gases. In addition, when the valve cover 82 opens, it shuts off a safety cut-off switch 84 to interrupt the electrical circuit for producing fuel.

Figure 4:
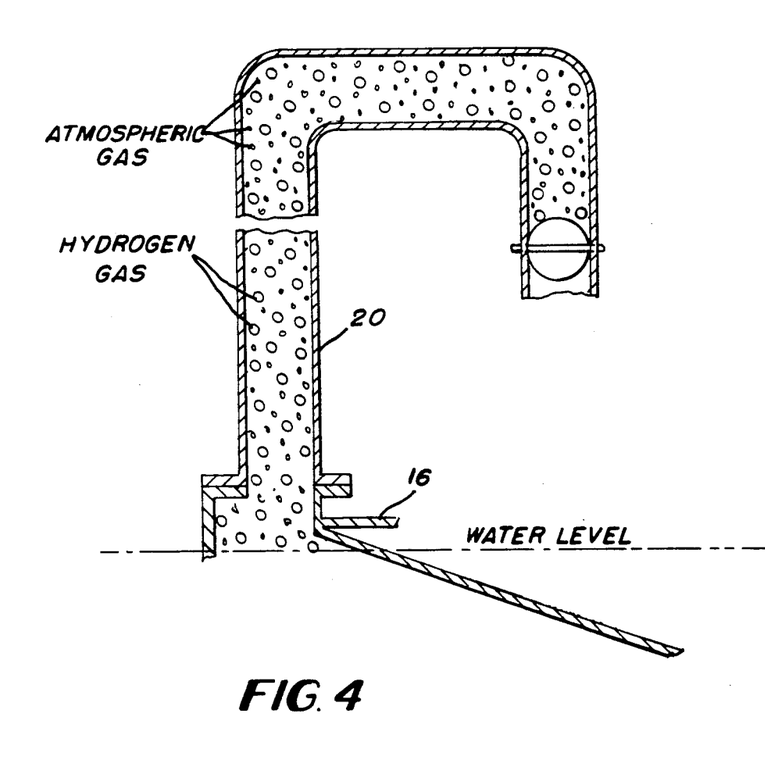
FIG. 4 shows a cutaway of a hydrogen gas inlet manifold and fuel production tank of the invention.

Another embodiment of the hydrogen inlet pipe 20 is shown in FIG. 4. The hydrogen inlet pipe 20 has an inverted U-shape bend where the lighter hydrogen gas collects in the bend and atmospheric gas, which is heavier, drops down the hydrogen manifold on the engine side of the U-bend 16. If there is a back flash problem, the hydrogen collected in the neck will not ignite, however since there is no oxygen in the hydrogen to burn. In the neck of the pipe, continued ignition will not be supported. This arrangement eliminates the need for the purge valve shown in FIG. 9.

Figure 10:
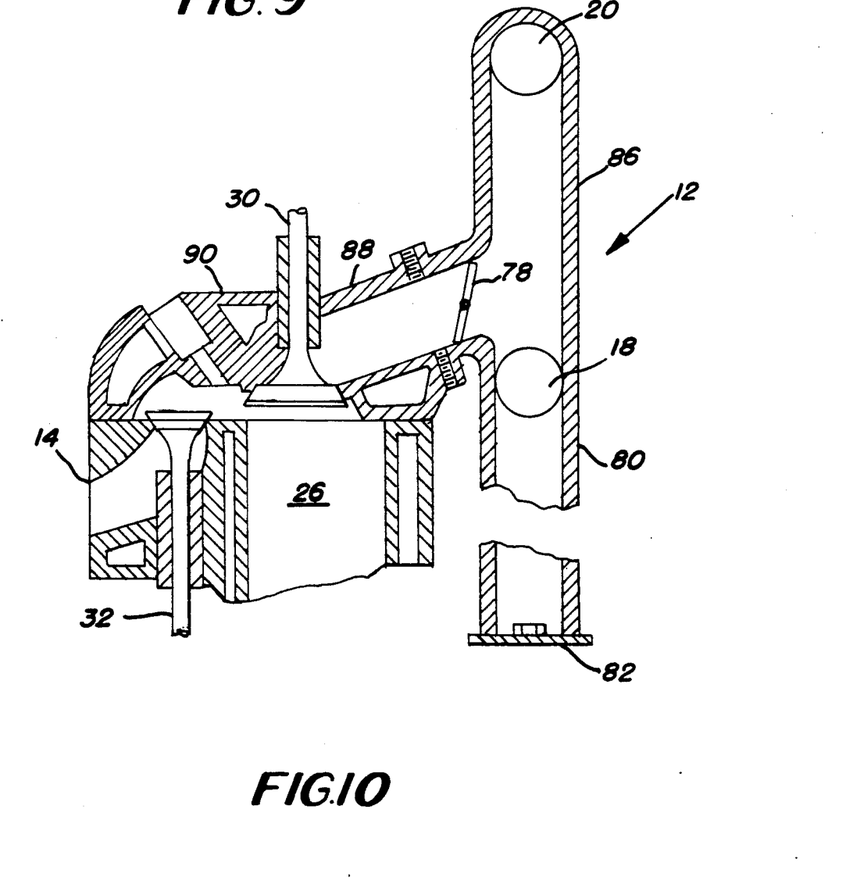
FIG. 10 is a cut away of an engine cylinder and intake manifold of the invention.

Throttle 78 is shown in FIG. 10 in manifold 12. The hydrogen inlet 20 and oxygen inlet 18 feed into leg 86 of manifold 12. T-shaped leg 88 houses the throttle valve 78 and connects to valve head 90 of engine 10. Only a portion of the valve head 90 is shown, in order to emphasize the manifold 12 and its relationship to intake valve 30 and exhaust valve 32. Throttle valve 78 controls the amount of hydrogen and oxygen emitted into the cylinder 26. Intake valve 30 controls the timing when the gases enter the cylinder, which is different for a four cycle engine and a two cycle engine. Once the hydrogen and oxygen have been exploded they are forced out of the cylinder and past exhaust valve 32 into exhaust manifold 14. In this embodiment, the blow back valve 82 is present.

Figure 11:
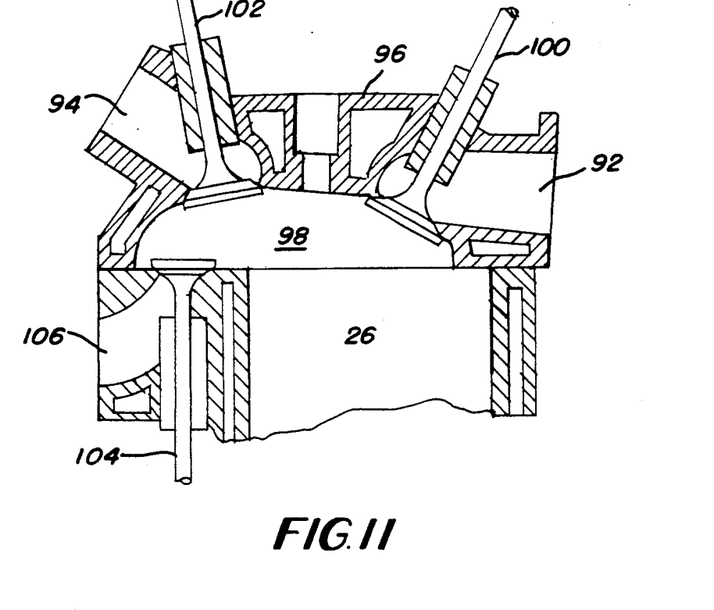
FIG. 11 is a cut away view of a modification of an intake manifold of the invention.

Another embodiment of an intake manifold is shown in FIG. 11 where the hydrogen inlet pipe 20 (not shown) connects to manifold inlet 92 and oxygen inlet pipe 18 (not shown) connects to manifold inlet 94 in head 96. A mixing chamber 98 is positioned above the cylinder 26, the chamber being part of head 96. There are two intake valves 100 and 102 which open together to emit hydrogen and oxygen into chamber 98. A single exhaust valve 104 opens to remove exhaust gases and expel them through manifold 106.

Figure 12:
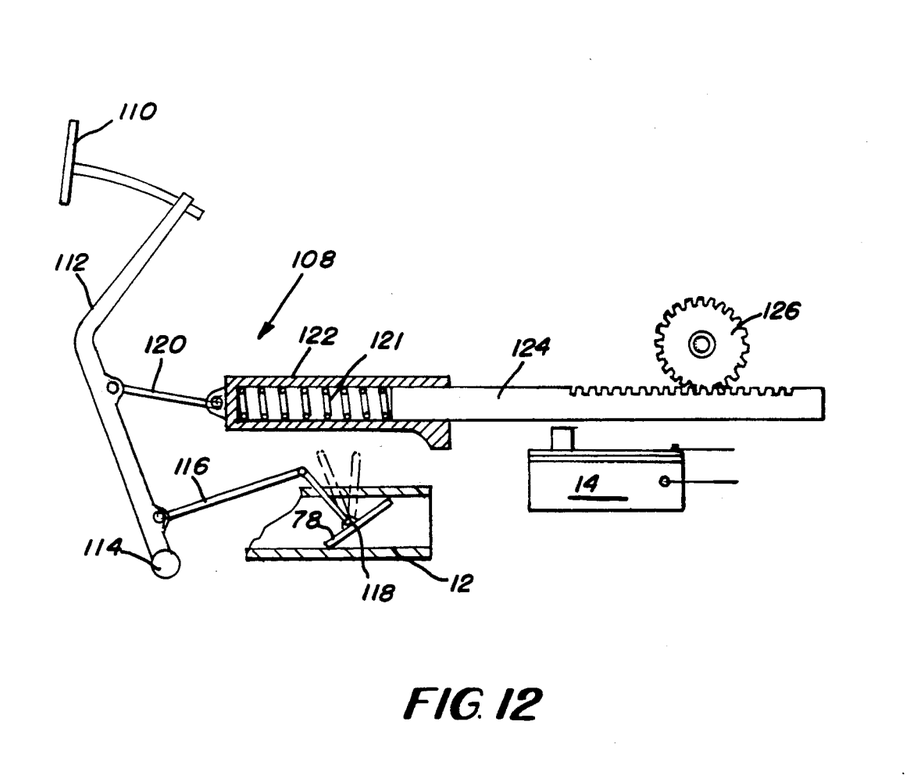
FIG. 12 is a side view of an engine throttle control of fuel of the invention.
Figure 13:
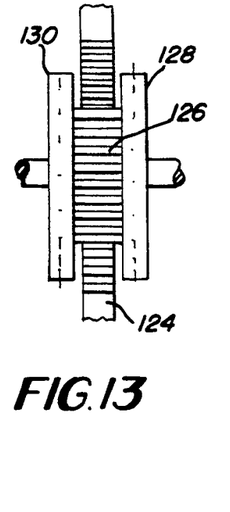
FIG. 13 is a partial top view of the engine throttle control of FIG. 12 taken along the line 13—13.

FIGS. 12-18 are directed to an electrical circuitry and an accelerator system for controlling the production of fuel and the engine throttle 78. FIG. 12 shows the mechanical accelerator system 108 which operates the electrical circuitry and the engine throttle. There is an accelerator pedal 110 connected to an L-shaped arm 112 which pivots about pivot point 114. A first lever 116 connected to arm 112 at one end is connected to throttle valve 78 at the other end. Depressing pedal 110 rotates the throttle valve 78 about pivot 118 to open the valve.

Dependent upon the movement of arm 112, the throttle valve opens a little or a lot to emit controlled amounts of hydrogen and oxygen to the engine.

A second lever 120 is pivotally connected to arm 112 at one end and to a reciprocating sleeve 122 at the other end. The sleeve 122 reciprocates on rack gear 124, causing the gear to reciprocate. A coiled spring 126 is housed in the sleeve 122, resisting the movement of rack gear 124. A second spring of equal or greater strength, is located between rack gear 124 and a rack stop 127 and cooperates to apply pressure to the rack gear 124. When pressure is applied to pedal 110 both springs are compressed. However, when pressure is removed from the pedal the springs cooperate to move the pedal to its rest position. The springs and their operation form no part of the present invention, and only represent one type of pedal return mechanism. As the pedal 110 moves the rack gear 124 it causes a pinion gear 126 to rotate counterclockwise. The pinion gear 126 supports a pair of rotating switches 128 and 130, which electrically control the production of fuel.

Figure 14:
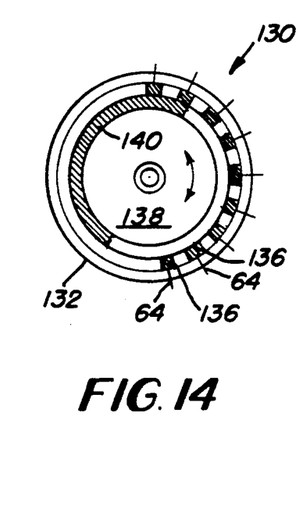
FIG. 14 is a plan view of an anode electrode control of the invention.
Figure 15:
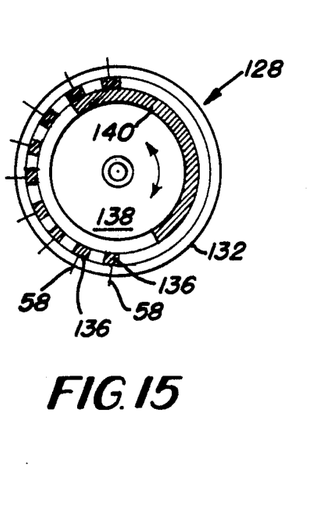
FIG. 15 is a plan view of a cathode electrode control of the invention.

Rotating switches 128 and 130 are structurally similar, except one switch 128 controls electricity to the cathodes 158, and the other switch 130 controls electricity to the anodes 62. FIGS. 14 and 15 show that the switches are mirror images of each other. Each switch has an outer stationary ring 132 with electrical leads 58 for the cathode switch 128 and leads 64 for the anode switch 64 projecting from the ring 132. An inner stationary ring 134 with electrical contacts 136 is in constant contact with the electrical leads. The inner ring 136 is pressed into a tight fit with outer ring 132. A rotating inner ring 138 with an electrical contact 140 covering one-half of its circumference is connected to pinion gear 126 for rotating inside the stationary inner ring 134. The electrical contact 140 is connected to a source of D.C current.

As the inner ring 138 rotates its electrical contact 140 completes an electrical circuit with one of the contacts 136 and its electrical lead 58 or 64. Each lead 58 or 64 is attached to a cathode 56 or an anode 62, respectively.

Figure 16:
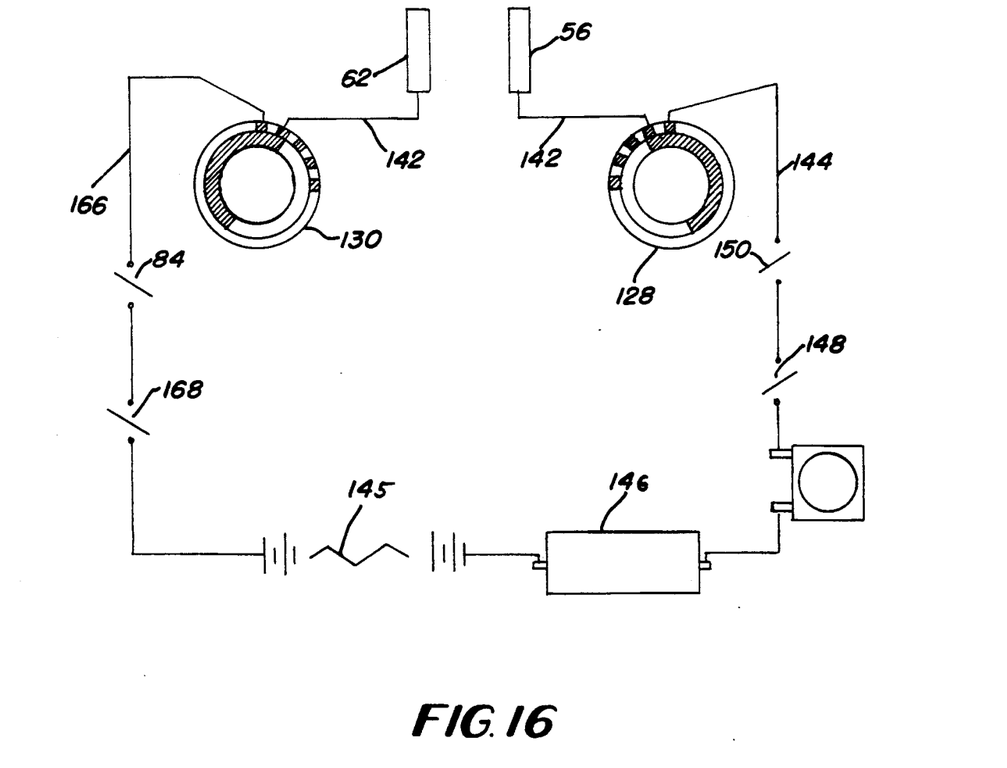
FIG. 16 is a schematic of an electrical system for controlling the production of fuel of the invention.

A better understanding of the electrical circuit can be had in FIG. 16. The rotating switches 128 and 130 are connected to cathodes 56 and anodes 62, respectively, via electrical leads 142. The cathode rotating switch 128 is connected by an electrical lead 144 to a D.C. battery 146. Wired into the electrical lead 144 is a rheostat 146 to control the output of the battery. An ignition starter switch 148 is also wired into lead 144. An impact switch 150 wired in the lead 144, is designed to break the circuit in case there is an impact, to shut off the engine.

Figure 18:
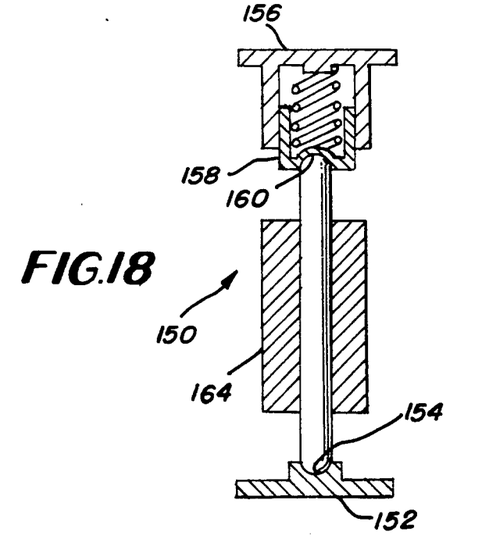
FIG. 18 is a cross sectional view of an impact switch of the invention.

FIG. 18 shows the impact switch 150 having a fixed terminal 152 with a concaved surface 154 and a spring loaded terminal 156 with a spring loaded push button 158. There is a concaved surface 160 in the push button 158. A removable electrode 162 is positioned between the concaved surfaces 154 and 160 where it is held. A weighted cylindrical body 164 is secured to the electrode 162 so that an impact will cause the weighted body 164 to unseat from the concaved surfaces 154 and 160.

Figure 17:
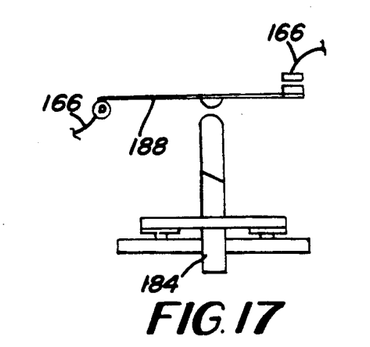
FIG. 17 is an open centrifugal switch of the invention.
Figure 17A:
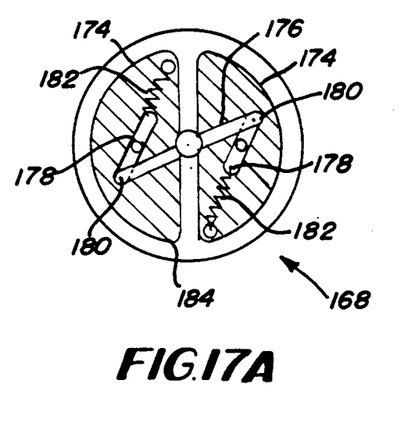
FIG. 17A is a top view of FIG. 17.
Figure 17B:
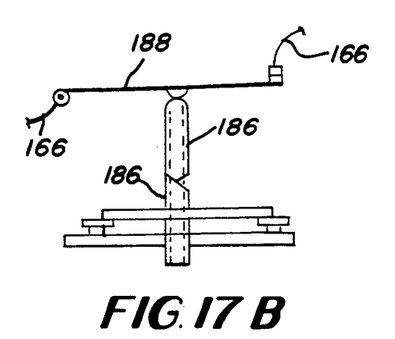
FIG. 17B is a side view of a closed centrifugal switch of the invention.
Figure 17C:
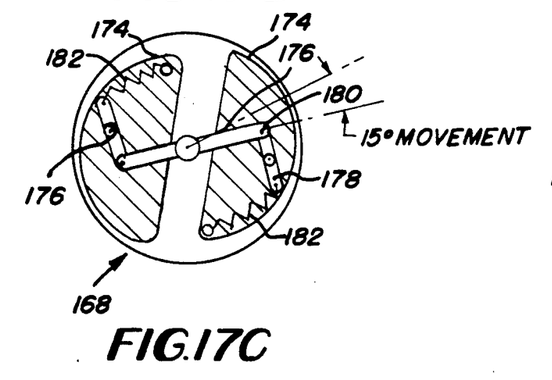
FIG. 17C is a top view of FIG. 17B.

Turning to the anode rotary switch 130 there is an electrical lead 166 which connects to battery 146. Between the battery and rotary switch is a centrifugal switch 168, best seen in FIGS. 17 to 17c. The centrifugal switch 168 is designed to turn "on" the electrical circuit once the engine is rotating at a number of specified revolutions per minute. Should the engine stall or stop rotating, the electrical circuit would be switched off, stopping any further manufacture of oxygen and hydrogen gases. FIGS. 17 and 17a show the switch 168 at rest and contacts 170 and 172 open. Centrifugal weights 174 are reciprocatable on a rotating shaft 176. A pair of pivotal arms 178 are attached to the shaft 176 at 180 and to weights 174 by springs 182. A center shaft 184 with a cam upper shaft 186 is raised and lowered by the rotation of the weights 174. FIGS. 17b and 17c show the centrifugal switch 168 rotating pushing the weights away from the center shaft 184 pushing cam upper shaft 186 up against the switch blade 188, closing the contacts 170 and 172.

Also wired into lead 166 is blow back valve switch 84 which opens if there is any blow back, as described earlier.

While only one embodiment of the invention has been disclosed it is understood that those skilled in the art may realize other embodiments, therefore one should look to the drawings, specification and claims for a complete understanding of the invention.

What is claimed is:

1. A water to fuel production apparatus for providing fuel for an internal combustion engine comprising:
   a fuel production tank having at least a pair of dividers to separate said tank into a first compartment, a second compartment and a third compartment, where said pair of dividers seal each compartment from the others at the top of said tank, and connect said compartments along the bottom of said tank;
   b. said first compartment having cathodes for the production of hydrogen, and an outlet connected to a hydrogen inlet pipe;
   c. said second compartment having anodes for the production of oxygen, and an outlet connected to an oxygen inlet pipe;
   d. said third compartment being between said first and said second compartment for providing water and exhaust water vapor to said compartments, and an inlet connected to an engine exhaust pipe for delivering exhaust water vapor to said third compartment;
   e. said hydrogen inlet pipe and said oxygen inlet pipe being connected to an engine intake manifold for delivering fuel to the engine;
   f. said cathodes and anodes having insulated cylindrical tubes surrounding each cathode and anode, each of said cathodes and anodes being supported above the bottom edge of said dividers and having electrical leads connected to a source of electricity to produce hydrogen and oxygen by electrolysis.

2. A water to fuel production apparatus as in claim 1 wherein said hydrogen inlet pipe and said oxygen inlet pipe connect to a vertical hydrogen and oxygen mixing pipe of said intake manifold, where said intake manifold having an inlet opening between said hydrogen inlet pipe and said oxygen inlet pipe for mixing the hydrogen and oxygen as they enter said inlet opening.

3. A water to fuel production apparatus as in claim 2 wherein a pivotal throttle valve is pivotally mounted in said intake manifold to control the intake of hydrogen and oxygen into the engine.

4. A water to fuel production apparatus as in claim 2 wherein said hydrogen inlet pipe having an inverted U-shape to allow lighter hydrogen gases to rise above atmospheric gases so that any premature ignition will stop as soon as it reaches the pure hydrogen gas at the bottom of the inverted U-shape bend on the engine side of said bend.

5. A water to fuel production apparatus as in claim 2 wherein a down pipe is connected to said vertical mixing pipe, said down pipe having a purge valve means whereby said valve is forced open to release ignited hydrogen and oxygen prematurely ignited in said intake manifold.

6. A water to fuel production apparatus as in claim 5 wherein a mechanical control means controls the electric source to said cathodes and anodes, and the operation of said throttle valve means having a pedal means connected to a first lever said first lever connected to a means for individually switching on and off each cathode and anode to produce hydrogen and oxygen according to engine demands, said pedal means connected to a second lever for opening and closing said throttle valve means.

7. A water to fuel production apparatus as in claim 6 wherein said means for individually switching on and off each cathode and anode including a pair of switches each having a stationary means with electrical contacts separated from one another and where each of said contacts is connected to a separate cathode or anode, and a movable means having an electrical contact means capable of opening and closing an electrical contact to each cathode or anode.

8. A water to fuel production apparatus as in claim 1, wherein a mechanical control means controls the electric source to said cathodes and anodes, and the operation of said throttle valve means having a pedal means connected to a first level said first lever connected to a means for individually switching on and off each cathode and anode to produce hydrogen and oxygen according to engine demands, said pedal means connected to a second lever for opening and closing said throttle valve means.

9. A water to fuel production apparatus as in claim 8 wherein said means for individually switching on and off each cathode and anode including a pair of switches each having a stationary means with electrical contacts separated from one another and where each of said contacts is connected to a separate cathode or anode, and a movable means having an electrical contact means capable of opening and closing an electrical contact to each cathode or anode.

10. A water to fuel production apparatus as in claim 9 wherein said individually switching means are connected to said electrical source by having a safety impact switch means between said cathode switch and said electrical source and safety centrifugal switch means between said anode switch and said electrical source for stopping the production of hydrogen and oxygen if the engine stalls or there is an impact.

11. A water to fuel production apparatus as in claim 1 wherein said hydrogen inlet pipe having an inverted U-shape to allow lighter hydrogen gases to rise above atmospheric gases so that any premature ignition will stop as soon as it reaches the pure hydrogen gas at the bottom of the inverted U-shape bend on the engine side of said bend.

12. A water to fuel production apparatus for providing fuel for an internal combustion engine comprising:
   a fuel production tank having at least a pair of dividers to separate said tank into a first compartment, a second compartment and a third compartment, where said pair of dividers seal each compartment from the others at the top of said tank, and connect said compartments along the bottom of said tank;

b. said first compartment having cathodes for the production of hydrogen, and an outlet connected to a hydrogen inlet pipe;

c. said second compartment having anodes for the production of oxygen, and an outlet connected to an oxygen inlet pipe;

d. said third compartment being between said first and said second compartment for providing water and exhaust water vapor to said compartments, and an inlet connected to an engine exhaust pipe for delivering exhaust water vapor to said third compartment;

e. said hydrogen inlet pipe and said oxygen inlet pipe being separately connected to a mixing chamber in a valve head of an internal combustion engine for delivering fuel to the engine;

f. said cathodes and anodes having insulated cylindrical tubes surrounding each cathode and anode, each of said cathodes and anodes being supported above the bottom edge of said dividers and having electrical leads connected to a source of electricity to produce hydrogen and oxygen by electrolysis.

13. A water to fuel production apparatus as in claim 12 wherein a mechanical control means controls the electric source to said cathodes and anodes, and the operation of said throttle valve means having a pedal means connected to a first lever said first lever connected to a means for individually switching on and off each cathode and anode to produce hydrogen and oxygen according to engine demands, said pedal means connected to a second lever for opening and closing said throttle valve means.

14. A water to fuel production apparatus as in claim 13 wherein said means for individually switching on and off each cathode and anode including a pair of switches each having a stationary means with electrical contacts separated from one another and where each of said contacts is connected to a separate cathode or anode, and a movable means having an electrical contact means capable of opening and closing an electrical contact to each cathode or anode.

15. A water to fuel production apparatus as in claim 12 wherein a mechanical control means controls the electric source to said cathodes and anodes, and the operation of said throttle valve means having a pedal means connected to a first lever and said first lever is connected to a means for individually switching on and off each cathode and anode to produce hydrogen and oxygen according to engine demands, said pedal means is connected to a second lever for opening and closing said throttle valve means.

16. A water to fuel production apparatus as in claim 15 where said means for individually switching on and off each cathode and anode includes a pair of switches each having a stationary means with electrical contacts separated from one another and where each of said contacts is connected to a separate cathode or anode, and a movable means having an electrical contact means capable of opening and closing an electrical contact to each cathode or anode.

17. A water to fuel production apparatus as in claim 16 wherein said individually switching means are connected to said electrical source by having a safety impact switch means between said cathode switch and said electrical source and safety centrifugal switch means between said anode switch and said electrical source for stopping the production of hydrogen and oxygen if the engine stalls or there is an impact.

* * * * *